United States Patent
Fraunholz et al.

(10) Patent No.: US 12,538,098 B2
(45) Date of Patent: Jan. 27, 2026

(54) SPOOFING PROTECTION FOR MOBILE DEVICE POSITIONING

(71) Applicant: Nokia Technologies Oy, Espoo (FI)

(72) Inventors: Daniel Fraunholz, Munich (DE); Daejung Yoon, Nozay (FR); Diomidis Michalopoulos, Munich (DE)

(73) Assignee: Nokia Technologies Oy, Espoo (FI)

( * ) Notice: Subject to any disclaimer, the term of this patent is extended or adjusted under 35 U.S.C. 154(b) by 358 days.

(21) Appl. No.: 18/247,177

(22) PCT Filed: Oct. 12, 2020

(86) PCT No.: PCT/US2020/055216
§ 371 (c)(1),
(2) Date: Mar. 29, 2023

(87) PCT Pub. No.: WO2022/081125
PCT Pub. Date: Apr. 21, 2022

(65) Prior Publication Data
US 2023/0379662 A1 Nov. 23, 2023

(51) Int. Cl.
*H04W 4/029* (2018.01)
*H04W 12/104* (2021.01)

(52) U.S. Cl.
CPC ......... *H04W 4/029* (2018.02); *H04W 12/104* (2021.01)

(58) Field of Classification Search
CPC ... H04W 4/029; H04W 12/104; H04W 64/00; G01S 5/0215; G01S 5/021; H04L 5/0048
USPC ........................................................ 455/410
See application file for complete search history.

(56) References Cited

U.S. PATENT DOCUMENTS

| | | | |
|---|---|---|---|
| 10,080,098 B1 | 9/2018 | Edge | |
| 10,219,106 B1* | 2/2019 | Lam | H04W 12/108 |
| 2008/0182592 A1* | 7/2008 | Cha | H04W 12/08 |
| | | | 455/456.3 |
| 2011/0040870 A1* | 2/2011 | Wynn | H04L 63/08 |
| | | | 709/224 |
| 2013/0223626 A1 | 8/2013 | Edge et al. | |
| 2013/0251150 A1* | 9/2013 | Chassagne | H04L 63/123 |
| | | | 380/270 |

(Continued)

FOREIGN PATENT DOCUMENTS

| | | |
|---|---|---|
| CN | 104603637 A | 5/2015 |
| CN | 105532058 A | 4/2016 |

(Continued)

OTHER PUBLICATIONS

Extended European Search Report received for corresponding European Patent Application No. 20957857.4, dated Jun. 10, 2024, 7 pages.

(Continued)

*Primary Examiner* — Michael Thier
(74) *Attorney, Agent, or Firm* — Barta Jones, PLLC

(57) ABSTRACT

The present disclosure inter alia relates to a network entity comprising means for: obtaining or determining a position estimate of a mobile device for verification; transmitting or causing transmitting a positioning reference signal to a position indicated by the position estimate for verification; and trying to verify the position estimate for verification at least based on a potential response from the mobile device received in response to the positioning reference signal.

9 Claims, 10 Drawing Sheets

(56) References Cited

U.S. PATENT DOCUMENTS

| | | | | |
|---|---|---|---|---|
| 2015/0071092 | A1* | 3/2015 | Mirbagheri | H04L 1/0038 370/252 |
| 2016/0065342 | A1 | 3/2016 | Mirbagheri et al. | |
| 2016/0309298 | A1 | 10/2016 | Dupray et al. | |
| 2016/0327629 | A1 | 11/2016 | Pandharipande et al. | |
| 2018/0167775 | A1 | 6/2018 | Tian et al. | |
| 2018/0262265 | A1 | 9/2018 | Hyslop | |
| 2019/0182665 | A1* | 6/2019 | Edge | H04W 12/06 |
| 2020/0154240 | A1* | 5/2020 | Edge | H04W 4/029 |
| 2020/0200858 | A1 | 6/2020 | Wirola et al. | |
| 2021/0329417 | A1* | 10/2021 | Priyanto | H04W 64/00 |
| 2021/0333410 | A1* | 10/2021 | Gum | G01S 19/48 |
| 2022/0046425 | A1* | 2/2022 | Edge | H04W 12/122 |
| 2022/0408220 | A1* | 12/2022 | Edge | H04W 4/029 |

FOREIGN PATENT DOCUMENTS

| | | |
|---|---|---|
| CN | 108886759 A | 11/2018 |
| EP | 2397868 A1 | 12/2011 |
| KR | 20110091289 A | 3/2013 |
| KR | 101701912 B1 | 2/2017 |
| WO | 2016/190806 A1 | 12/2016 |
| WO | 2017/052978 A1 | 3/2017 |
| WO | 2020/092715 A1 | 5/2020 |

OTHER PUBLICATIONS

"New SID on NR Positioning Enhancements", 3GPP TSG RAN Meeting #86, RP-193237, Agenda: 9.1.1, Qualcomm Incorporated, Dec. 9-12, 2019, 4 pages.

"Measurements for PRS on-demand", 3GPP TSG RAN WG1 #96bis, R1-1905265, Agenda: 7.2.10.4, Nokia, Apr. 8-12, 2019, 3 pages.

"On Demand Transmission of PRS for NR", 3GPP TSG-RAN WG2 Meeting #105, R2-1901373, Agenda: 11.8.2, Qualcomm Incorporated, Feb. 25-Mar. 1, 2019, pp. 1-15.

"NR on-demand access for forward compatibility", 3GPP TSG RAN WG1 #86, R1-166464, Agenda: 8.1.1, CATT, Aug. 22-26, 2016, pp. 1-3.

"Potential Enhancements for NR Positioning", 3GPP TSG RAN WG1 Meeting #101-E, R1-2003769, Agenda: 8.2.3, Intel Corporation, May 25-Jun. 5, 2020, pp. 1-7.

International Search Report and Written Opinion received for corresponding Patent Cooperation Treaty Application No. PCT/US2020/055216, dated Feb. 10, 2021, 11 pages.

Office action received for corresponding Indian Patent Application No. 202347032016, dated Aug. 12, 2024, 8 pages.

Office action received for corresponding Chinese Patent Application No. 202080107067.9, dated Oct. 25, 2024, 12 pages of office action and 5 pages of translation available.

"On Demand Transmission of PRS for NR", 3GPP TSG-RAN WG2 Meeting #104, R2-1817902, Agenda: 11.8.2, Qualcomm Incorporated, Nov. 12-16, 2018, pp. 1-27.

Hui et al., "Location Privacy Preservation in Wireless Sensor Networks", Journal of Software, vol. 26, No. 3, 2015, pp. 617-639.

Notice of Allowance received for corresponding Chinese Patent Application No. 202080107067.9, dated Jan. 3, 2025, 4 pages of Notice of Allowance and no page of translation available.

Jiang et al., "A TDOA Estimation method of PRS in LTE System", Journal of Information & Computational Science, vol. 11, No. 2, Jan. 20, 2014, pp. 509-517.

"3rd Generation Partnership Project; Technical Specification Group Radio Access Network; NG Radio Access Network (NG-RAN); Stage 2 functional specification of User Equipment (UE) positioning in NG-RAN (Release 18)", 3GPP TS 38.305 V18.4.0, Dec. 2024, pp. 1-184.

"3rd Generation Partnership Project; Technical Specification Group Services and System Aspects; Security aspects of Uncrewed Aerial Systems (UAS) (Release 18)", 3GPP TS 33.256 V18.2.0, Mar. 2024, pp. 1-28.

"3rd Generation Partnership Project; Technical Specification Group Services and System Aspects; Service requirements for the 5G system; Stage 1 (Release 20)", 3GPP TS 22.261 V20.1.0, Dec. 2024, pp. 1-144.

"3rd Generation Partnership Project; Technical Specification Group Radio Access Network; LTE Positioning Protocol (LPP) (Release 18)", 3GPP TS 37.355 V18.4.0, Dec. 2024, pp. 1-410.

"Session-less SL positioning and groupcast / broadcast messaging", 3GPP TSG-RAN WG2 Meeting #122, R2-2304717, Nokia, Agenda Item: 7.2.2, May 22-26, 2023, 6 pages.

"Discussion of signalling procedures", 3GPP TSG-RAN WG2 Meeting #122, R2-2304716, Nokia, Agenda Item: 7.2.2, May 22-26, 2023, 9 pages.

"Work Plan for NR Positioning Enhancements Work Item", 3GPP TSG-RAN WG1 Meeting #104 bis electronic, R1-2103034, Intel Corporation, Agenda Item: 8.5, Apr. 12-20, 2021, pp. 1-8.

"3rd Generation Partnership Project; Technical Specification Group Radio Access Network; Study on NR Positioning Enhancements; (Release 17)", 3GPP TR 38.857 V17.0.0, Mar. 2021, pp. 1-545.

Office action received for corresponding European Patent Application No. 20957857.4, dated Apr. 14, 2025, 4 pages.

Office Action received for corresponding Korean Patent Application No. 2023-7015135, dated Jul. 21, 2025, 7 pages of Office Action and 5 pages of translation available.

* cited by examiner

US 12,538,098 B2

SPOOFING PROTECTION FOR MOBILE DEVICE POSITIONING

RELATED APPLICATION

This application claims priority to PCT Application No. PCT/US2020/055216, filed on Oct. 12, 2020, each of which is incorporated herein by reference in its entirety.

TECHNOLOGICAL FIELD

The disclosure is related to communication networks, such as wireless radio networks comprising base stations and a mobile device such as a user equipment communicating with each other. More specifically, the disclosure pertains to position estimates of such mobile devices in such communication networks.

BACKGROUND

The present disclosure is related but not limited to communication networks as defined by the 3GPP standard, such as the 5G standard, also referred to as New Radio, NR.

In 3GPP new radio (NR) positioning is supported with so called positioning reference signals (PRS), which may be downlink (DL) or uplink (UL) positioning reference signals (DL-PRS or UL-PRS) with further positioning enhancements, especially focusing on IoT technology and applications. Key objectives are enhancements and solutions necessary to support requirements regarding the high accuracy (horizontal and vertical), low latency, network efficiency (scalability, overhead, etc.), and device efficiency (power consumption, complexity, etc.). In addition to the system performance, integrity is a crucial metric for positioning techniques.

Mobile Networks (MNs) may require locating the position of a User Equipment (UE) to provide specific services or applications (location-based services/applications). To determine the position of a UE, 3GPP defines multiple methods. Mainly, the network estimates a UE position, i.e. via a network-based method requiring cooperation by the UE (UE-assisted), or the position estimation is performed the UE itself, i.e. the UE estimates its own position (UE-based). Furthermore, downlink and uplink signal based methods are typically distinguished. In 5G, the so called Location Management Function (LMF) is responsible to compute a positioning coordination in the cellular network systems.

For instance, in case of a UE-assisted downlink signal-based method, the LMF may configure a UE to perform measurements on a DL-PRS. The UE may then report back the measurement to the LMF. The LMF determines the position of the UE based on these measurements.

The PRS can be further improved as a so called on-demand PRS. On-demand PRS are configured in a UE specific manner by the LMF for a specific user demand of positioning service. The LMF configures the Base Station (BS) to send the on-demand PRS to a specific UE location and configures the UE the measure and report the on-demand PRS. The on-demand PRS is intended to increase efficiency, especially in rural areas, as the PRS transmissions can be reduced to occasions, where it is requested by the LMF (in comparison to the case, where the PRS is continuously transmitted).

There is now the problem that a UE may try to spoof its position. This may be of interest in order to circumvent geo-fencing or other position-based restrictions. For this, a UE may have modified hardware and software to perform such a spoofing attempt. With a modified software measurements sent to the LMF may be tampered. With a tampered hardware (e.g. advanced antennas) signals on different beams may be received after a successful spoofing. Generally, the spoofing may be intentional behavior of the UE owner or may be unintentional as a consequence of a compromised UE.

As already mentioned above, positioning methods rely on signals or measurements from and/or to the UE for the determination of its position. Examples of signals measured by the UE are the 5G NR positioning reference signal (PRS), specifically designed for the purpose of positioning and already mentioned above, but also signals such as a sounding reference signal (SRS), a downlink reference signal for measuring the received power (DL-RSRP), a downlink reference signal for measuring the time difference (DL-RSTD), or the Rx-Tx time difference. It is assumed that there is an inherent trust relationship between the UE and the LMF. In other words, the LMF will trust the measurements reported by UEs. A UE may be exploiting this trust by sending tampered signals or measurements (e.g. a DL UE measurement of the LTE Positioning Protocol (LPP) message type "Provide Location Information"). For example, a MN may try to locate a UE to provide access to a sensitive application. The tampered UE receives the request for a DL RSRP measurement. The tampered UE then does not send the actual measurements to enable genuine localization, but instead sends tampered measurements so that the LMF will calculate a false position. By tampering the measurement values the UE may be able to pretend to be at specific locations to access application that are restricted to specific locations.

Thus, as an outcome of a successful attack, the LMF will calculate a wrong (spoofed) position based on the tampered signals or measurements provided by the UE. The UE may access services or applications that are supposed to be not accessible from the actual/real (in contrast to the spoofed) UE position.

Thus, there is the need to improve the integrity or security for positioning of UEs in a communication network.

SUMMARY OF SOME EXEMPLARY EMBODIMENTS

Certain embodiments may have the effect that the integrity or security for positioning of UEs in a communication network is improved. Certain embodiments may have the effect that spoofing of positions of mobile device in a communication network is prevented or impeded.

According to a first exemplary aspect, a network entity is inter alia disclosed comprising means for:
  obtaining or determining a position estimate of a mobile device for verification;
  transmitting or causing transmitting a positioning reference signal to a position indicated by the position estimate for verification; and
  trying to verify the position estimate for verification at least based on a potential response from the mobile device received in response to the positioning reference signal.

According to the first exemplary aspect, a method is also disclosed, performed at least by a network entity, the method comprising:

obtaining or determining a position estimate of a mobile device for verification;

transmitting or causing transmitting, based on the position estimate for verification, a positioning reference signal to the position indicated by the position estimate for verification; and trying to verify the position estimate for verification at least based on a potential response from the mobile device received in response to the positioning reference signal.

According to a second exemplary aspect, a mobile device is inter alia disclosed comprising means for:

receiving a nonce from a network;

receiving a positioning reference signal from the network;

transmitting, to the network, a response to the received positioning reference signal for verification of a position estimate of the mobile device; and using the received nonce for at last one of said receiving, from the network, of the positioning reference signal and said transmitting, to the network, of the response to the received positioning reference signal.

According to the second exemplary aspect, a method is also disclosed, performed at least by a mobile device, the method comprising:

receiving a nonce from a network;

receiving a positioning reference signal from the network;

transmitting, to the network, a response to the received positioning reference signal for verification of a position estimate of the mobile device; and using the received nonce for at last one of said receiving, from the network, of the positioning reference signal and said transmitting, to the network, of the response to the received positioning reference signal.

The network entity of the first exemplary aspect may be an electronic device, such as an entity of a radio access network or the core network of communication system. For instance, the network entity may be or comprise a base station or be in communication with a base station. Generally, the network entity may be a hardware or software component implementing a certain functionality. In an example, the network entity may be understood to be the Location Management Function (LMF) as defined by the 3GPP 5G standard or one or more devices realizing such a functionality. Accordingly, while the network entity may be understood to be implemented in or be a single device or module, the network entity may also be implemented across or comprise multiple devices or modules. As such, the network entity may in particular be implemented in or be a stationary device. Multiple network entities of the first exemplary aspect may in particular establish a communication system or network, which may in particular be a New Radio (NR) or 5G system or any other mobile communications system defined by a past or future standards, in particular successors of the present 3GPP standards. The network entity of the first exemplary aspect may be in direct or indirect communication with the mobile device of the second exemplary aspect.

The mobile device of the second exemplary aspect may be an electronic device, such as a user equipment or mobile station. The mobile device may in particular be a device, such as a smart phone, a tablet, a wearable, a smartwatch or the like. A user equipment or mobile station may be understood as any device used directly by an end-user to communicate with a network. The mobile device of the second exemplary aspect may be in direct or indirect communication with the network entity of the first exemplary aspect.

The means of any of the disclosed apparatuses can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

Thus, according to a respective exemplary aspect of the present disclosure, there is also disclosed a respective apparatus (i.e. a network entity and a mobile device) comprising at least one processor and at least one memory including computer program code, the at least one memory and the computer program code configured to, with the at least one processor, cause an apparatus at least to perform and/or to control the method according to a respective exemplary aspect of the present disclosure.

Any of the above-disclosed apparatuses may be a module or a component for a device, for example a chip. The disclosed apparatus may comprise the disclosed components, for instance means, processor, memory, or may further comprise one or more additional components.

The method of a respective aspect may for instance be performed and/or controlled by the apparatus according to the respective aspect, i.e. network entity or the mobile device, respectively. Generally, however, a respective method may also be performed and/or controlled by more than one apparatus, for instance by a user equipment and a network working together.

According to the first and second exemplary aspects of the present disclosure, there is in each case also disclosed a computer program, the computer program when executed by a processor of an apparatus causing said apparatus to perform a method according to the first and second aspect respectively.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

There is also disclosed a system comprising a network entity of the first aspect and a mobile device of the second aspect working together for performing aspects of the disclose.

In the following, further exemplary features and exemplary embodiments of the different aspects of the present disclosure will be described in more detail.

The position estimate of a mobile device for verification may be understood to be a previous or to be verified position estimate securely obtained for the mobile device. The position estimated may be needed by the mobile device or the network in order to allow access to a sensitive application or a function thereof. For instance, the position estimate of the mobile device may be needed at a service point, e.g. for obtaining a service or performing a function at the service point, such as authorizing access to information, authorizing a payment, opening a door or the like. The (previous) position estimate for verification may have been obtained according to any known positioning method, e.g. a positioning technique base on a cellular or non-cellular communication network (in particular a communication network to which the network entity of the first exemplary aspect pertains) or on a global navigation satellite system (GNSS), as described in the background section. Also, the position estimate for verification may have been determined by the mobile device and/or the network.

A positioning reference signal may in particular be a dedicated signal, which is specifically designed for the purpose of positioning, such as the positioning reference signal, PRS, of the 3GPP 5G standard (such as the DL-PRS). A positioning reference signal may in particular be understood to require or trigger a response of the receiving mobile device. Generally, the positioning reference signal may also be a signal designed for a different purpose but which can also be used for positioning purposes and which in particular trigger a response of the mobile device receiving the signal, such as reference signals (e.g. a sounding reference signal, a DL RSRP, DL RSTD or Rx-Tx time difference.

As the position estimate for verification indicates a (true or alleged) position (i.e. geographic location) of the mobile device, the positioning reference signal can be transmitted (or caused to be transmitted) at least to this very position, as will be described in further details below.

The transmission may in particular be performed by a base station of the communication network, as an example of the network entity of the first aspect. Alternatively, the network entity may be in communication with a base station and may cause the transmission of the positioning reference signal e.g. by requesting or scheduling a respective transmission.

The action of trying to verify the position estimate for verification is in particular understood to mean that a verification process is performed, so that the (previous and to be verified) position estimate is, as a result thereof, either verified or not. In other words, it is determined whether there is the risk that the position estimate is spoofed or not. Such verification is (at least) based on a potential response from a mobile device.

For instance, the verification may in particular depend on which response is received or whether a response is received at all, e.g. within a predetermined time window, which will also be discussed in more detail below. For instance, in case the mobile device is a true mobile device and the position estimate is a legitimate position estimate, e.g. the true mobile device is actually located at the position indicated by the position estimate to be verified, then the (true) mobile device will be able to receive the positioning reference signal transmitted to the position indicated by the position estimate and will be able to respond properly. For instance, in case the mobile device is a spoofing mobile device and the position estimate is a spoofed position estimate, e.g. the spoofing mobile device is not actually located at the position indicated by the position estimate to be verified, then the (spoofing) mobile device will not be able to receive the positioning reference signal transmitted to the position indicated by the position estimate and will not be able to respond properly.

The response of the mobile device in response to the positioning reference signal may depend on the type of positioning reference signal and the prescribed reaction thereto. Typically, the mobile device will make a measurement of the positioning reference signal or of a certain characteristic of the positioning reference signal (such as a measurement of the received power or a timing measurement) depending on the type of reference signal, and then report the measurement result back to the network. For instance, the mobile device may measure a positioning measurement using the positioning reference signal and then report the measurements back to the respective network as s response to the positioning reference signal. In one example, the mobile device may perform a position estimate based on the positioning reference signal and report back the position estimate. In another example, the mobile device may make a measurement and report back the measurement to the network, which may then determine a position estimate based thereon.

Generally a measurement on a positioning reference signal may be a timing measurement, an angular measurement, a signal received power measurement, a downlink time difference of arrival, DL-TDOA, measurement, an uplink time difference of arrival, UL-TDOA, measurement, a downlink angle of departure, AoD, measurement, and/or an angle of arrival, AoA, measurement. Accordingly the response to the received positioning reference signal may be based on or comprise a measurement on the received positioning reference signal, wherein the measurement may be any of the above or any combination thereof.

A transmission of the positioning reference signal to the position indicated by the position estimate for verification is understood that the positioning reference signal may at least be sent to the position or location indicated by the position estimate for verification. Thus, the position estimate may also be sent to other positions or locations surrounding the position indicated by the position estimate for verification. The area, in which the positioning reference signal may be receivable may inter alia depend on the capabilities of the network with respect to a directional transmission, as will be explained below.

In an example, the at least one positioning reference signal is transmitted to the position indicated by the position estimate for verification using a transmission, such that the positioning reference signal is only receivable at the position estimate for verification and at a limited area around the position estimate for verification. For instance, the positioning reference signal may only be receivable in the coverage area of one or more base stations or of one or more cells or of one or more beams covering the position indicated by the position estimate for verification.

For instance, the at least one positioning reference signal may be transmitted to the position indicated by the position estimate for verification using at least one base station, multiple base stations or only precisely one base station.

The term base station is understood broadly and may in particular cover a base station of the 3G, 4G, 5G or any future generation cellular communication standard. Thus a base station may in particular be a NodeB (NB), an evolved Node B (eNB) or a next generation NodeB (gNB).

In an example, the at least one positioning reference signal is transmitted to the position indicated by the position estimate for verification using directional transmission. A direction transmission may in particular be realized via beamforming. This may allow to transmit the positioning reference signal to a very limited area (e.g. a fraction of a cell) around the position estimate to be verified. For instance, the positioning reference signal may be transmitted to the position indicated by the position estimate for verification using at least one or precisely one beam covering the position estimate for verification. In case of multiple beams, at least one beam may cover the position estimate for verification. As explained above, a (spoofing) mobile device outside the coverage area of the respective beam(s) will not be able to respond to the position reference signal, while a mobile device within a coverage area of the respective beam(s) will basically be able to receive the position reference signal and respond thereto.

In an example, the network entity comprises means for providing, to one or more base stations, configuration data pertaining to the transmission of the position reference signal from one or more base stations to a specific mobile device for (position) verification purpose. For instance, the configuration data may comprise information for the base station(s) on a time and/or frequency resource for transmitting the positioning reference signal (to the specific mobile device). The respective base station(s) can then transmit the position reference signal according to the configuration data.

Likewise, in an exemplary embodiment, the network entity comprises means for providing, to a specific mobile device requiring (position) integrity verification, configuration data pertaining to the transmission of the position reference signal from one or more base stations to the specific mobile device. For instance, the configuration data may comprise information so that the mobile device knows when and how to listen for the positioning reference signal (sent by one or more base stations). For instance, the configuration data may comprise information on a time and/or frequency resource for receiving the positioning reference signal at the mobile device.

Alternatively, the configuration data may also pertain to the transmission of a positioning reference signal, which is to be transmitted from a mobile device to one or more base stations (UL-PRS).

The configuration data can be sent such that only a true mobile device but not a spoofing mobile device may receive or decode the configuration data. For instance, the configuration data may be sent as a mobile device-specific transmission. For instance, the configuration data may be sent via a data or control channel to a mobile device. For instance, in case the position estimate is an actual position estimate of a true mobile device, the mobile device will receive the configuration data and may measure the positioning reference signal. In case the position estimate is a spoofed position estimate of a spoofing mobile device, the device will not receive the configuration data, or will not be able to decode the configuration data, or will not be able to receive the positioning reference signal. In other words, depending on the situation, the mobile device, the position estimate of which is to be verified may or may not be the same mobile device as the one receiving the configuration data.

The transmission of the configuration data allows to implement an ad-hoc configuration capability of the network and the mobile device. The configuration data may be sent only directly before the actual positioning reference signal and/or may be sent for each positioning reference signal individually. This may further increase security as it will be more difficult for a spoofing mobile device to figure out the configuration in order to receive the positioning reference data.

In an example, the network entity comprises means for checking whether a response from the mobile device was received in response to the positioning reference signal in order to try to verify the position estimate for verification. The reception of a response to the positioning reference signal may be considered sufficient for verifying the position estimate.

As already explained above, in case the mobile device is able to respond to the positioning reference signal, it can be assumed that the mobile device was in a location and state, i.e. had sufficient information (e.g. configuration data and/or security information, as will be explained below), so as to receive the positioning reference signal. Accordingly, the position estimate for verification may be verified in case a response from the mobile device was received in response to the positioning reference signal.

In contrast, in case the mobile device is not able to respond to the positioning reference signal, it can be assumed that the mobile device was not in a location and/or state so as to receive the positioning reference signal. Accordingly, the position estimate for verification may not be verified in case no response from the mobile device was received in response to the positioning reference signal. For instance, after a predetermined time without a response, it may be assumed that the mobile device has not provided a response to the positioning reference signal.

In an example, the network entity apparatus comprises means for determining a further position estimate of the mobile device based on the potential response of the mobile device to the positioning reference signal. It may be the case that the case that a spoofing mobile device is able to respond to the positioning reference signal as it may be close to the spoofed position and able to receive the positioning reference signal. However, the further position estimate may indicate that the responding mobile device (which may generally be the spoofing mobile device or the true mobile device) may reside at a different location. For this, the position estimate for verification and the further position estimate can be compared in order to try to verify the position estimate for verification. The position estimate for verification may be verified in case the position estimate for verification and the further position estimate indicate the same position, while the position estimate for verification may not be verified in case the position estimate for verification and the further position estimate different positions.

In an example, the network entity comprises means for not verifying the position estimate for verification in case multiple responses from mobile devices were received in response to the positioning reference signal. This may allow to identify spoofed position estimates for instance in a scenario, in which a spoofing mobile device is pretending to be located at a position of a true mobile device close by, so that the spoofing mobile device and the true mobile device are co-located. Thus, they both may receive the positioning reference signal and may both be in a state to provide a corresponding response thereto. Accordingly, multiple responses to the positioning reference signal nay be considered as in indicator of a spoofed position estimate.

In an example, the network entity comprises means for transmitting or causing transmitting a nonce to a mobile device. The nonce may for instance be used for scrambling or encoding the positioning reference signal. The mobile device may then use the nonce in order de descramble or decode the scrambled or encoded nonce. Accordingly, the nonce may be considered a security nonce or cryptographic nonce. However, more generally, also other cryptographic information may be used. It is generally only important that it is made sure that such information used for scrambling/descrambling or encoding/decoding the positioning reference signal is only available at a true mobile device being located at the position to be verified. The process of descrambling/scrambling or decoding/encoding may in particular be applied in the digital domain. For instance, the nonce may be transmitted to the mobile device over a data channel or control channel, for instance DCH or CCH. For instance, the transmission of the nonce to the mobile device may be a secured transmission so that it can be assured that only a true mobile device may receive the nonce. For instance, the nonce may be transmitted via a secured service application. A nonce is generally understood as any arbitrary information (e.g. a number or word) that is used just once for the purpose of securing the communication. For instance, the nonce may be a random or pseudo-random number, which may be issued in an authentication protocol. This may ensure that previous communication sessions, i.e. data exchanged therein, cannot be reused in replay attacks.

The nonce may in particular be configured or transmitted via a higher layer, e.g. a high service layer. For instance, the nonce may be configured or transmitted using a secured service application and/or a secured service application layer. This can make sure that only the true mobile device but not a spoofing mobile device is able to receive the nonce. For instance a higher layer may be understood as any layer above the physical layer or layer 1 of the OSI model. In one example the higher layer may be data link layer or a network layer. For instance the higher layer may be layer 2 or layer 3 (or even above) of the OSI model. For instance, the higher layer may be a medium access control, MAC, layer (as a sublayer of the data link layer). For instance the nonce may be configured or transmitted via the radio resource control, RRC, protocol (as part of the network layer). For instance the higher layer may be a layer at application level, e.g. the application layer, layer 7 of the OSI model. In case the nonce is transmitted via a secured service application, this may be understood to mean that the nonce is transmitted above the RAN layers (e.g. above layer 3). A secured service application may have or provide its own security operations (e.g. based on a key or password), so that communication may be encrypted at the application level. The mobile device application can then pass down the nonce to the physical layer (layer 1) for receiving/transmitting the positioning reference signal. In contrast, the positioning reference signal transmission may operate (e.g. exclusively) at the physical layer.

It is noted that the mobile device, depending on the situation, may or may not be the device whose position estimate is to be verified. E.g. in case the position estimate of a true device is to be verified, this true mobile device will also receive the correct nonce. However, in case the position estimate of a spoofing device is to be verified, this spoofing mobile device will not be able to receive the (correct) nonce.

In one example, the nonce may be transmitted to the mobile device as part of configuration data prior to the transmission of the positioning reference signal. As explained above, the configuration data may only be receivable by a true mobile device but not by a spoofing mobile device (e.g. because it is sent via a secure channel or secured service application). Accordingly, only the true mobile device will be able to receive the configuration data and also the nonce.

As explained above, only a mobile device actually residing at or near the position indicated by the position estimate (e.g. in the coverage area of a respective base station(s), cell(s) or beam(s)) and configured correctly will be able to receive the positioning reference signal and will in particular be able to measure positioning measurements based on the PRS scrambled by the nonce. A true UE decoding the PRS based on the nonce will be able to respond to the position reference signal. A spoofing mobile device will not be able to receive or decode the PRS scrambled by a dedicated nonce.

In an example, the nonce may be transmitted or caused to be transmitted to a base station, e.g. as part of configuration data, prior to the transmission of the positioning reference signal. The base station is then able to transmit the nonce e.g. with the positioning reference signal or to scramble or encode the positioning reference signal with the nonce.

Accordingly, in an example, the network entity comprises means for transmitting or causing transmitting the positioning reference signal based on the nonce and in particular for scrambling the positioning reference signal based on the nonce for transmission to the position indicated by the position estimate for verification.

In an example, the network entity comprises means for checking whether a response from the mobile device obtained in response to the positioning reference signal comprises the nonce.

As already explained, by checking whether a response is received at the network (because the positioning reference signal could be descrambled or decoded) and/or whether the correct nonce is returned to the network, the verification of the position estimate may performed.

From the perspective of a mobile device, a nonce is received from the network (e.g. from a base station as described above). The mobile device can then use the nonce for receiving and/or responding to a positioning reference signal.

In one example, the mobile device receives a positioning reference signal from the network, and it uses the received nonce for said receiving, from the network, of the positioning reference signal. For instance, the received nonce is used for said receiving, from the network, of the positioning reference signal, by descrambling or decoding the positioning reference signal at least based on the nonce, as already described above. The mobile device can then transmit, to the network, a response to the received positioning reference signal for verification of a position estimate of the mobile device.

In another example, the mobile device receives a positioning reference signal from the network. It transmits, to the network, a response to the received positioning reference signal for verification of a position estimate of the mobile device and can use the received nonce for said transmitting, to the network, of the response to the received positioning reference signal. For instance, the received nonce may be used for said transmitting, to the network, of the response to the received positioning reference signal by transmitting the nonce itself to the network in response to the positioning reference signal.

As described above, the mobile device may obtain configuration data pertaining to the reception of the position reference signal, which may indicate time and or frequency resources for receiving the positioning reference signal. Also, the mobile device may receive the nonce as part of such configuration data.

In an example, the positioning reference signal is a downlink positioning reference signal. Preferably, the positioning reference signal is an aperiodic positioning reference signal. In contrast to periodic positioning reference signals, an aperiodic positioning reference signal is not transmitted periodically or repeatedly. For instance, an aperiodic reference signal is only transmitted once. This may further decrease the chances that a spoofing device is able to receive the positioning reference signal and is able to spoof a position.

In an example, the positioning reference signal is an on-demand positioning reference signal. An on-demand reference signal is only transmitted when it is requested or desired. For instance, the network entity may request the transmission of the on-demand reference in order to perform the verification process as described.

An aperiodic or on-demand positioning reference signal is particularly advantageous for use in verification of a position estimate. The positioning reference signal can be specifically triggered when required for verification purposes and does otherwise not take up resources. Additionally, as the process of transmitting the positioning reference signal and the response can be specifically designed for the purpose of verification of a position estimate, such as scrambling the positioning reference signal with a nonce, wherein the nonce is transmitted via an application which requires the verification of the position estimate.

In an example, multiple positioning reference signals are transmitted using multiple base stations and/or multiple beams (of one or more base stations), wherein some or all base stations and/or beams use a different nonce for transmitting a respective positioning reference signal. A nonce may be used for transmitting the positioning reference signal by e.g. scrambling the positioning reference signal based on the nonce as already explained above.

A mobile device will only be able to receive the (correct) nonce(s) transmitted by the base station(s) or beam(s) covering the actual position of the mobile device e.g. using a secured service application. The nonce(s) transmitted by the base station(s) or beam(s) covering the spoofed position will not be receivable by the mobile device. Or, the nonce(s) configured at a secured service application layer will not be receivable by other mobile devices.

In an example, the network entity comprises means for informing a user of a mobile device of a potential spoofing existence in case the position estimate for verification is not verified. For instance, the user of the mobile device may receive a push message. It is noted that the user will typically be the user of a true mobile device, and thus the mobile device may not necessarily be the mobile device whose position estimate was to be verified.

Additionally, or alternatively the network entity comprises means for informing an operator of a network of a potential spoofing existence in case the position estimate for verification is not verified. Additionally or alternatively, the network entity comprises means for informing another network function or another network entity of a potential spoofing existence in case the position estimate for verification is not verified. For instance, the spoofing existence may be logged by the network, the respective network function or the respective network entity. This information may be used for any instant measures or it may be logged for future analysis, for instance.

Additionally or alternatively, access to the service (such as access to information, authorizing a payment, opening a door or the like), which requested the position of the mobile device or for which the position estimate was requested, may be denied. Alternatively, in one example, the verification process or parts thereof may be repeated and it may be again tried to verify the position estimate for verification.

In an example, the network entity comprises means for determining a nonce for positioning integrity by means of a higher layer in the network entity. For instance, the network entity may then determine a random seed (e.g. based on the nonce) associated with a sequence generation of positioning reference signal. The positioning reference signal is then transmitted from the network to the mobile device.

Additionally or alternatively, in an example, the network entity may comprises means for obtaining a nonce from a service application. In this case the network entity may not need to determine the nonce itself, but may obtain the nonce from a different entity. For instance, the service application may also determine a random seed associated with a sequence generation of a positioning reference signal. The network entity and the respective mobile device may then be provided with the nonce or with the random seed, e.g. at the service application layer.

Accordingly, the mobile device comprising means for receiving the nonce from the network or from the service application via a service application layer.

In an example, the network entity is or comprises a base station. In an example the network entity is or comprises an implementing a location management function. In an example, the network entity is or comprises a network entity communicating with at least one base station.

The described embodiments may have the advantage that the network has the capability to detect a mobile device spoofing its position and can, if necessary, increase the integrity level (trust, accuracy) of previous position measurements.

The described approach can be applied to and combined with basically any positioning method. This is specifically advantageous for any location-based service and/or application, which may require positioning with a particular level of integrity/trust with respect to the position, e.g. services/applications employing or relying on geo-fencing.

It is to be understood that the presentation of the embodiments disclosed herein is merely by way of examples and non-limiting.

Herein, the disclosure of a method step shall also be considered as a disclosure of means for performing the respective method step. Likewise, the disclosure of means for performing a method step shall also be considered as a disclosure of the method step itself.

Other features of the present disclosure will become apparent from the following detailed description considered in conjunction with the accompanying drawings. It is to be understood, however, that the drawings are designed solely for purposes of illustration and not as a definition of the limits of the present disclosure, for which reference should be made to the appended claims. It should be further understood that the drawings are not drawn to scale and that they are merely intended to conceptually illustrate the structures and procedures described herein.

The following description serves to deepen the understanding of the present disclosure and shall be understood to complement and be read together with the description of example embodiments of the present disclosure as provided in the above SUMMARY section of this specification.

While the specific radio system in the examples below is 5G, this is only to be considered a non-limiting example.

Figure 1:
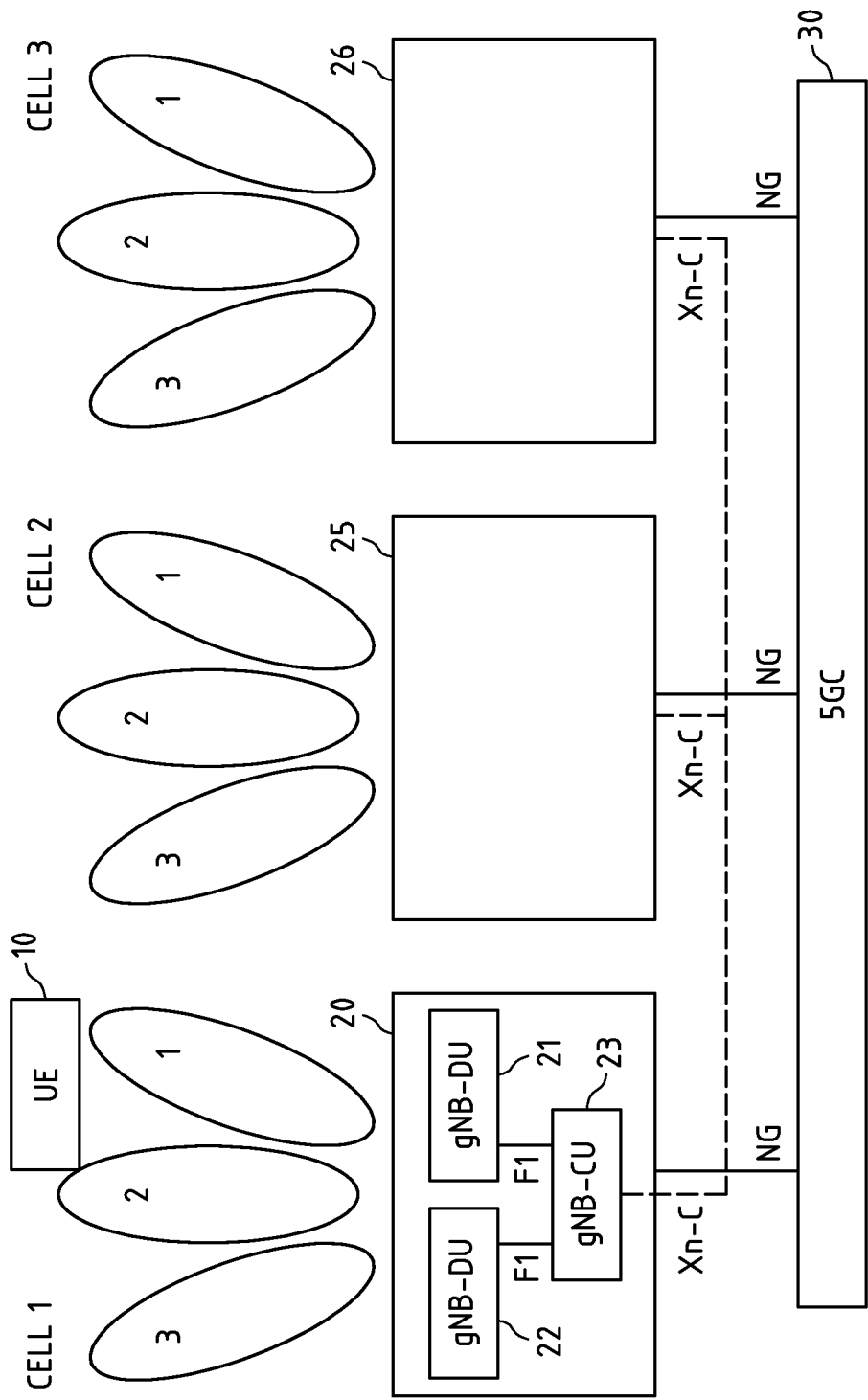
FIG. 1 is a schematic diagram illustrating an example radio environment in which exemplary embodiments of the present disclosure may be performed.

FIG. 1 shows an example environment, in which the present disclosure may be applied. FIG. 1 shows a 5G communication network, which introduces the New Radio technology and also an architecture for which the different sublayers of the RAN may be split into two logical entities in a communication network control element (like a BS or gNB), which are referred to as distributed unit (DU) and central unit (CU). For example, the CU is a logical node that controls the operation of one or more DUs over a front-haul interface (referred to as F1 interface). The DU is a logical node including a subset of the gNB functions, depending on the functional split option.

As shown in FIG. 1, a mobile device such as a user equipment (UE) 10, as an example of a mobile device of the second exemplary aspect, is connected to a cell 1 of a base station, a gNB 20 via a communication beam of the cell 1. In the example shown in FIG. 1, the gNB 20 is provided with a CU 23 and two DUs 21 and 22 being connected to the CU 23 by a F1 interface. Furthermore, as shown in the example of FIG. 1, there is a plurality of further cells (in FIG. 1, for illustrative purposes, two cells, i.e. cell 2 and cell 3 are shown) to which the UE 10 can connect. Similarly to cell 1, cells 2 and 3 are controlled by gNB 25 and 26, respectively, and each provides a plurality of beams 1 to 3. The different beams of a 5G network may be used for beam diversity or beam hopping.

As shown in FIG. 1, each base station or gNB of the cells is connected to a core network, such as a 5GC, via respective interfaces, indicated as NG interfaces. Furthermore, each gNB of the cells is connected with each other by means of a specific interface, which is referred to e.g. as an Xn-C interface.

Any of the network entities, such as the gNB, gNB-DU, gNB-CU and/or 5GC, may individually or together be an example of a network entity according to the first aspect of the disclosure.

In the following examples, the positioning reference signal will be an on-demand downlink positioning reference signal (DL PRS). An on-demand DL PRS transmission can be dynamically indicated and allocated by UE specific downlink control information (DCI) as a response to a positioning service request. The request can be triggered by the UE or by the network depending on the respective service. In addition, the UE can be provided with a specific DL PRS transmission resource and schedule, which may be constructed based on previous reports or data service resource information.

Figure 2:
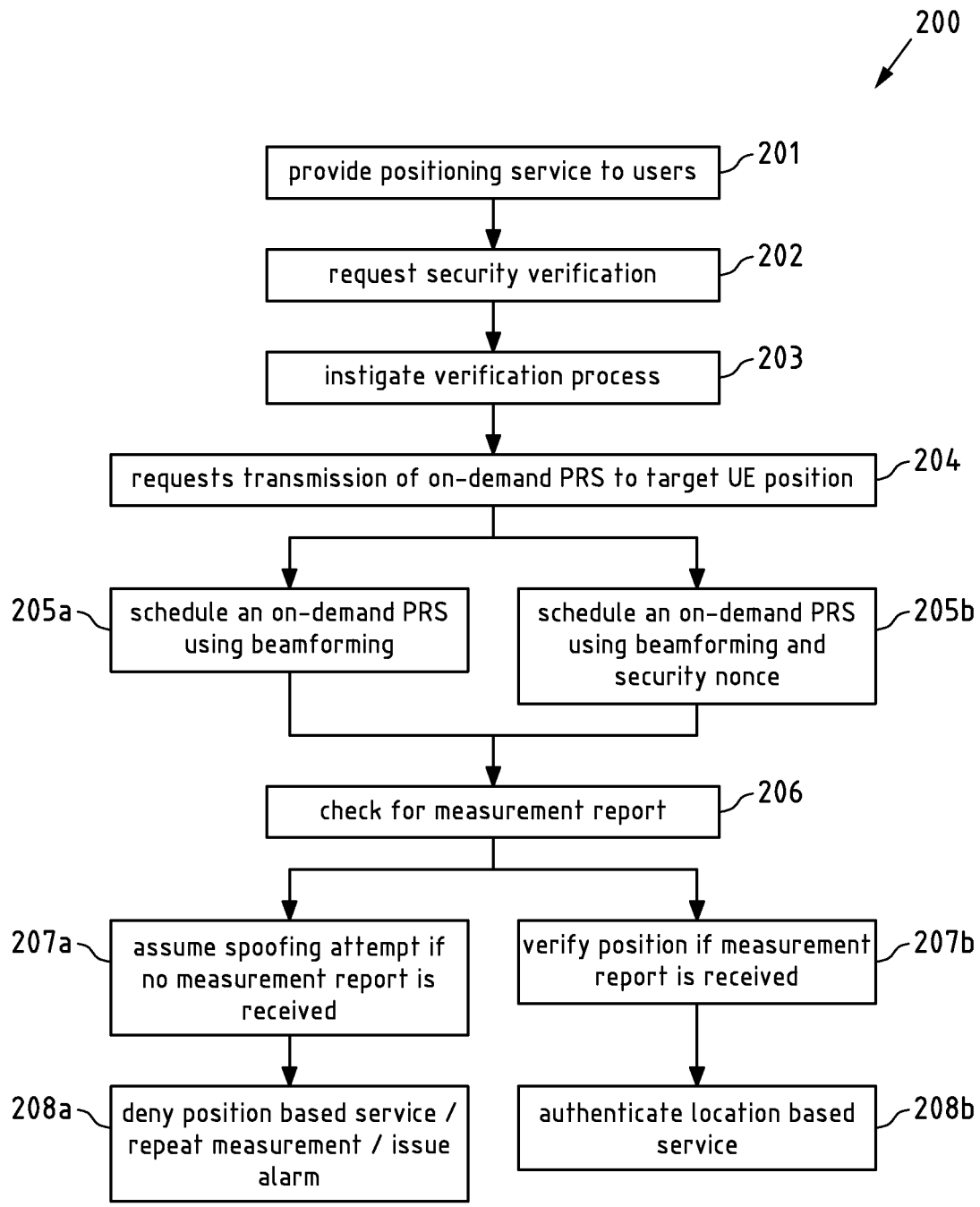
FIG. 2 is a flow diagram of an exemplary embodiment of the present disclosure.

With the use case and configuration of on-demand PRS, an example of the proposed verification process is outlined below with reference to FIG. 2.

Generally, a (regular) positioning service is provided to users. For this, cells configure DL PRS and UL SRS, normal measurements and reporting are conducted by network and UEs, action 201.

Since positioning is an important factor for communication integrity and security, a network or a user may request a security verification from the location management function, LMF (or from the network in general) for a specific service purpose of a location-based service (e.g. services pertaining purchases in a market or the opening of an entrance door etc.), action 202.

Based on the regular positioning estimate, the LMF instigates a verification process with regard to the estimated UE position, action 203. As explained, this may be required or requested for sensitive/security relevant applications. Also, this process may be triggered for detected irregularities in the UE behavior.

The LMF then requests the serving base stations and/or a number of neighboring base stations (there could be no neighboring base stations or at most those neighboring base stations, which are within the PRS detection range of the UE) to transmit an on-demand PRS to the target UE position, action 204. The on-demand PRS to the target UE may optionally be encrypted by a cryptographic nonce which allows the LMF to verify whether the UE location is legitimate or spoofed.

For this, a UE can be requested to measure the on-demand PRS and report results back to the LMF for security verification purpose. In the on-demand PRS scheduling, the following two examples of a verification processes for this scenario are illustrated.

In one embodiment, a spoofing UE remotely pretends to be present at a service point (e.g. a bank ATM, a vending machine, etc.). For verification it may be checked whether the target UE really locates at the service position measured through the regular positioning estimation. For this, the LMF schedules an on-demand PRS at the service position using beamforming, and requests the UE to measure the on-demand PRS, action 205a. If a UE is not present at the service point, the measurement cannot be executed and nor report is received, therefore the presence of a spoofing UE can be assumed. Thus, if the LMF doesn't receive any measurement report (e.g. within a limited time window), the LMF may make a security notice to a security layer of the service application that it detected a spoofing attempt.

In another embodiment, a spoofing UE is regarded to be present at a service point together with or near co-located with the real UE. For verification, it may be checked whether the target UE really locates at the service position and whether the service is under secured service. Also in this case, the LMF schedules an on-demand PRS at the service position using beamforming. In this embodiment, however, the PRS is scheduled with a security nonce. The security nonce can be sent by data channel (DCH or CCH) through a secured service application, action 205b. The on-demand PRS sequence is scrambled by a seed combination with the nonce, so the on-demand PRS cannot be read without the knowledge of the nonce. If a UE is not present at the service point or is not able to receive the on-demand PRS, the measurement cannot be executed and a spoofing attempt may be assumed. Accordingly, the presence of a UE and the integrity of a position estimate can be checked.

The LMF can then try to verify the reported UE measurement of the on-demand PRS. A possible verification evaluation depends on the UE measurement in response to the on-demand PRS, action 206: If the on-demand PRS measurement is verified successfully, action 207b, then a security of location-based service is authenticated, action 208b. If the on-demand PRS measurement is not verified, it is assumed the target UE is unknown and that the position may be spoofed, action 207a. As a result, as a subsequent action, the measurement may be repeated, the (position-based) service may be denied, or an alarm may be issued to the operator, action 208a.

The above described use of the on-demand PRS for position verification/spoofing detection, and specifically the use of beam forming and ad-hoc configuration capabilities of the on-demand PRS for position verification/spoofing detection allows for an improved the integrity or security for positioning of UEs in a communication network.

The above approaches will be further described with the exampled illustrated in FIGS. 3a, 3b and FIG. 4a, 4b and FIG. 5a, 5b.

Figure 3A:
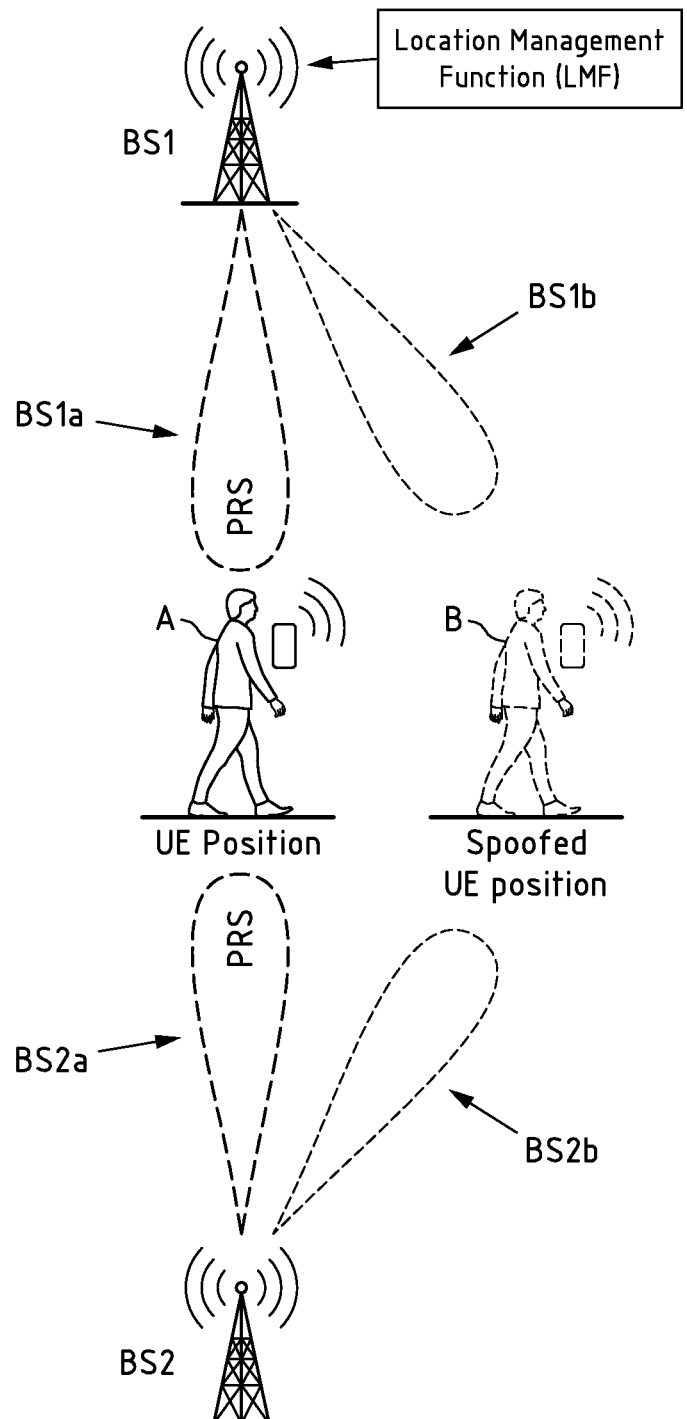
FIG. 3a is a schematic diagram illustrating an exemplary embodiment of the present disclosure.
Figure 3B:
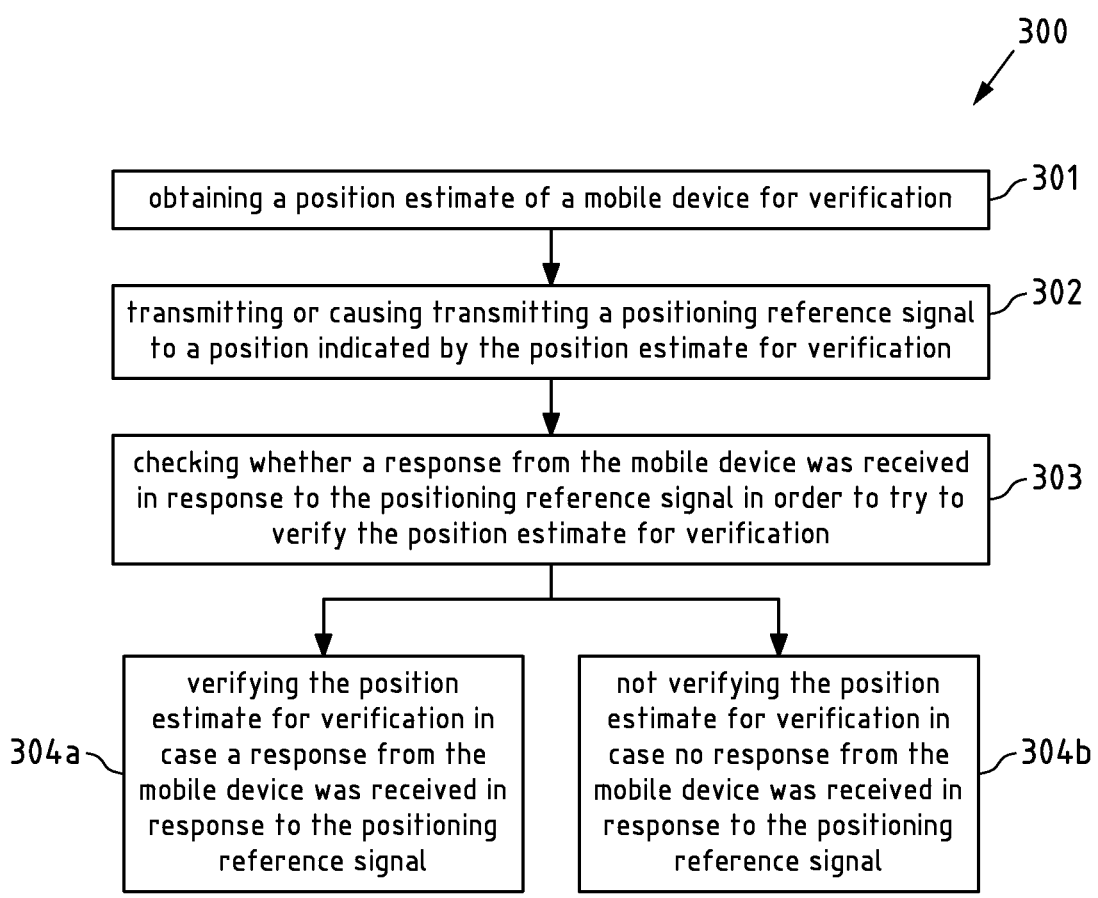
FIG. 3b is a flow diagram of an exemplary embodiment of the present disclosure.

Turning first to FIG. 3a, 3b an example of a security verification procedure, implemented in the network and UE using on-demand PRS is described, in which beamforming and the ad-hoc configuration capabilities of the on-demand DL-PRS signal are used to verify a UE position. In other words, the described location verification procedure allows verify a UE location using beamformed on-demand PRS configuration and transmission.

A position estimate of a mobile device is obtained for verification, action 301.

The network entity then transmits or causes transmitting a positioning reference signal PRS to a position indicated by the position estimate for verification, action 302. That is, the network attempts an aperiodic or on-demand DL-PRS scheduling for a UE verification purpose, so that the PRS is transmitted to a service location known from the previous measurement. In this case, as illustrated in FIG. 3a, a PRS is sent to the position A via beams BS1a, BS2a of base stations BS1 and BS2.

A true UE located at the position A is supposed to measure and report one or more respective positioning measurement(s) based on the on-demand PRS, so that position A can be verified. A spoofing UE, which resides in location A but pretends to be in a geographically different location B (i.e. in particular in the coverage area of a different beam and/or base station), will fail to measure the on-demand PRS, as the PRS would in that case be sent to the spoofed UE position B via beams BS1b, BS2b of base stations BS1 and BS2.

Accordingly, it can be checked whether a response from the mobile device was received in response to the positioning reference signal in order to try to verify the position estimate for verification, action 303.

In case a response from the mobile device was received in response to the positioning reference signal, the position estimate for verification is verified, action 304a. In case no response from the mobile device was received in response to the positioning reference signal, the position estimate for verification is not verified, action 304b.

In case a spoofing UE should be co-located with a true UE, and if it is also capable to act as if it is a true UE, the base station or LMF may collect multiple reports in response to the on-demand PRS. In case a serving base station should somehow collect such multiple measurements in response to a one-time on-demand PRS, the LMF can conclude that one of the responses is spoofed. This means that the LMF can detect at least a spoofing UE existence, and a service may inform a user on the possible spoofing existence.

Figure 4A:
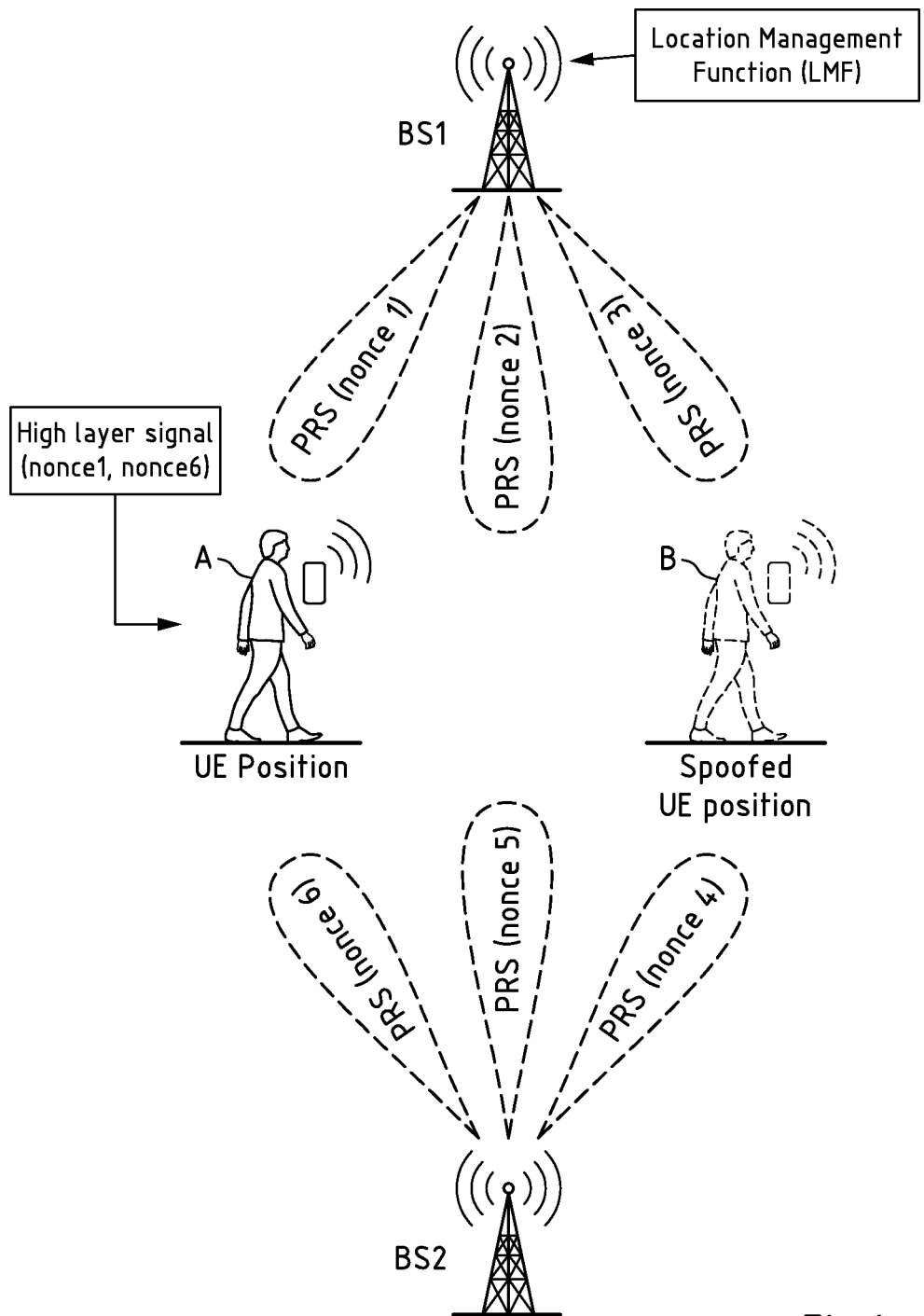
FIG. 4a is a schematic diagram illustrating an exemplary embodiment of the present disclosure
Figure 4B:
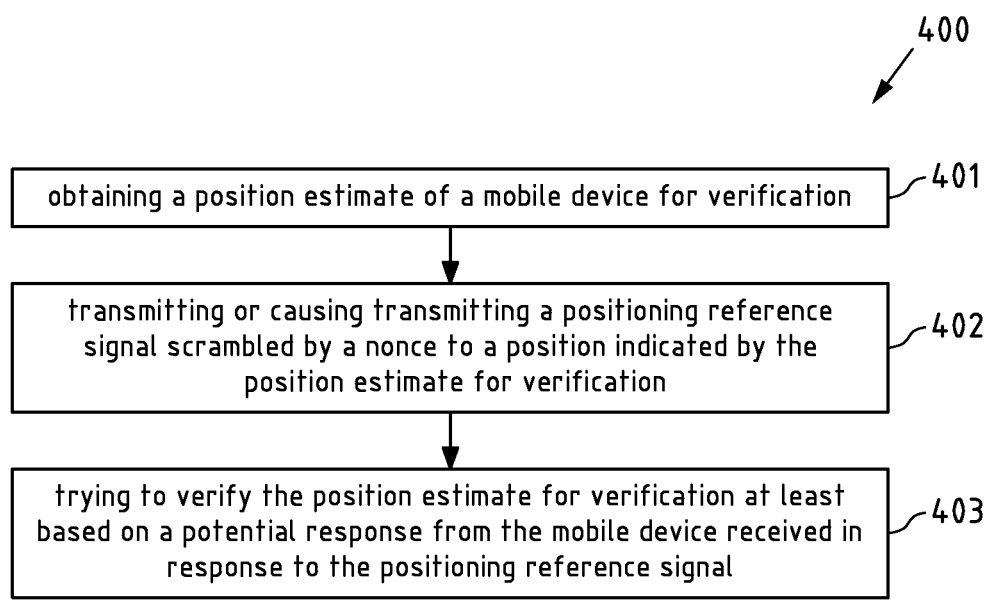
FIG. 4b is a flow diagram of an exemplary embodiment of the present disclosure.

Turning now to FIG. 4a, 4b an example of a security verification procedure using on-demand PRS is described, which not only utilizes beamforming and on-demand DL-PRS signals but also a cryptographic nonce to enhance the position verification.

First, similarly to the example of FIG. 3a, 3b, a position estimate of a mobile device is obtained for verification, action 401.

The network entity then transmits or causes transmitting a positioning reference signal PRS to a position indicated by the position estimate for verification, action 402. That is, the network attempts an aperiodic or on-demand DL-PRS scheduling for a UE verification purpose, so that the PRS is transmitted to a service location known from the previous measurement.

In contrast to the example from FIG. 3a, 3b, in this case, as illustrated in FIG. 4a, a PRS is sent to various positions, inter alia positions A and B via the different beams of base stations BS1 and BS2. However, each beam sends the PRS scrambled with a different nonce (referred to as "nonce1" to "nonce6" in FIG. 4a). Thus, multiple base stations, cells and/or beams can cooperate to verify a testing UE through individual transmission from each entity. The LMF can coordinate the respective transmission.

As described before, a true UE located for instance at the position A is able to measure and report one or more respective positioning measurement(s) based on the on-demand PRS, so that position A can be verified. It will only have obtained the corresponding nonce1 and nonce6 for descrambling the two PRS for verification purposes at position A. A spoofing UE, which resides in location A but pretends to be in a geographically different location B (i.e. in particular in the coverage area of different beams), will fail to measure the two on-demand PRS scrambled with nonce3 and nonce 4 respectively and the UE is also not physically in the respective coverage areas of the beams transmitting the two PRS scrambled with nonce3 and nonce4, respectively. Accordingly, a UE at position A will not be able to spoof a position at B even if it received the PRS at position A, as it will not be able respond with the correct nonces, as nonce3 and nonce4 are unknown to it.

Accordingly, it can be checked whether a response from the mobile device was received in response to the positioning reference signal in order to try to verify the position estimate for verification, action 403.

In case a response from the mobile device was received in response to the positioning reference signal, the position estimate for verification is verified, while in case no response from the mobile device was received in response to the positioning reference signal or a response with an incorrect nonce, the position estimate for verification is not verified.

Figure 5A:
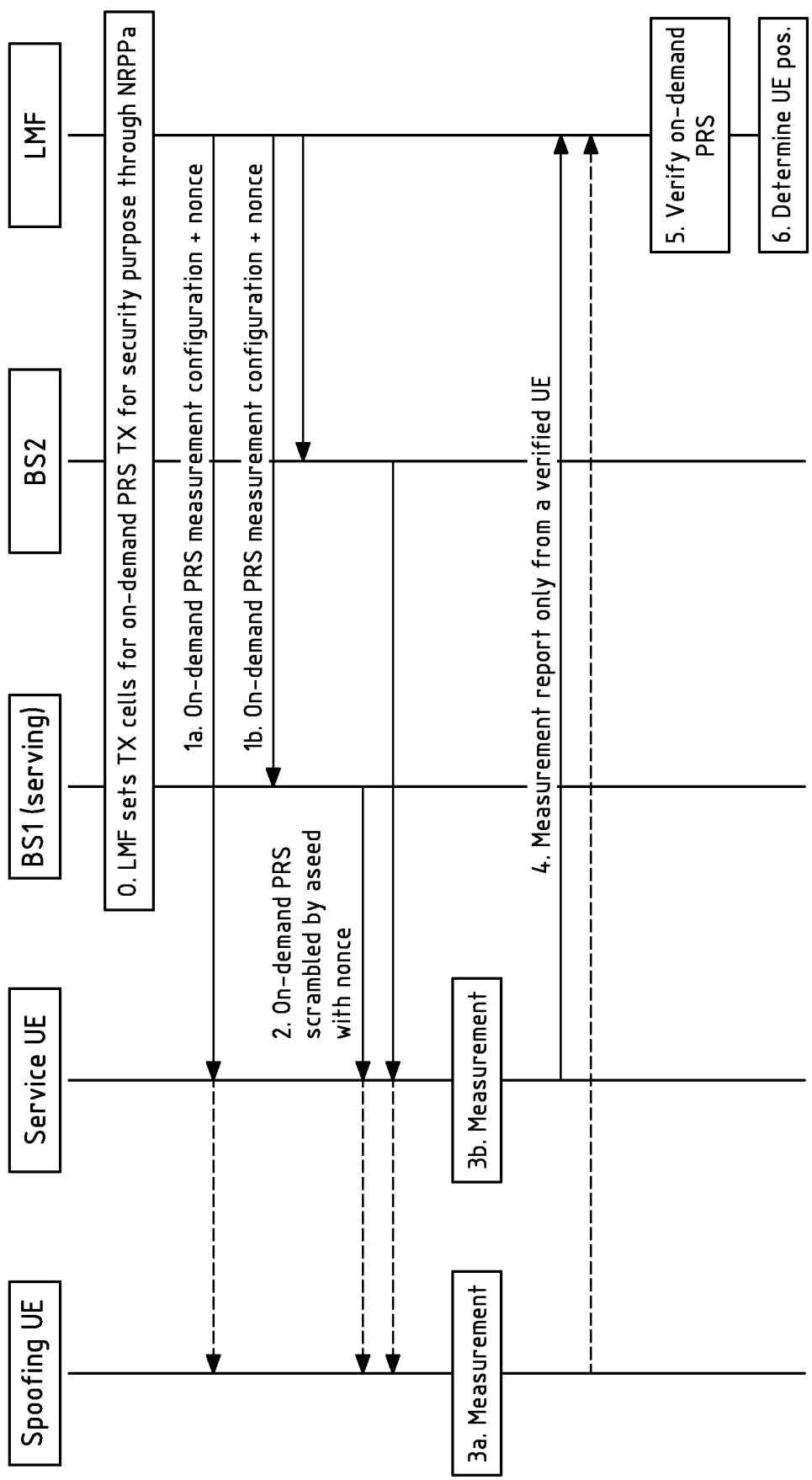
FIG. 5a is an exemplary signaling chart of an exemplary embodiment of the present disclosure.
Figure 5B:
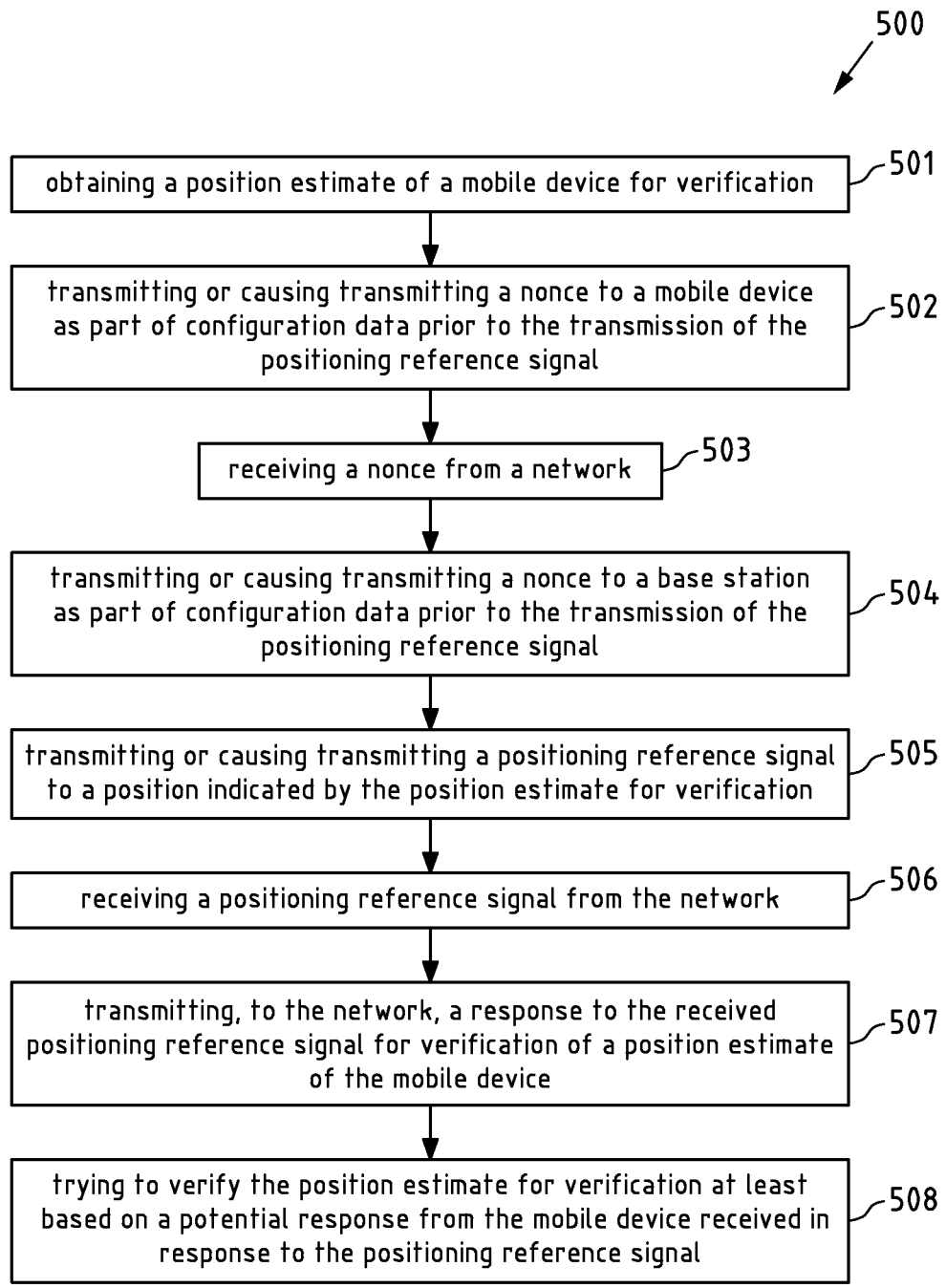
FIG. 5b is a flow diagram of an exemplary embodiment of the present disclosure.

Turning now to FIG. 5a, 5b, a further example of a security verification procedure using on-demand PRS is described, which also utilizes beamforming, on-demand DL-PRS and a cryptographic nonce to enhance the position verification.

The LMF obtains a position estimate of a mobile device for verification, action 501.

The LMF configures a (true) UE (denoted "Service UE" in FIG. 5a) for receiving an on-demand PRS by transmitting configuration data (e.g. time and frequency resources). The UE is not only configured to receive the on-demand PRS configuration but to also receive a nonce, which may be included in the configuration data for instance, action 1a in FIG. 5a and action 502 in FIG. 5b. Correspondingly, the UE receives the nonce from the network, action 503. However, UEs spoofing their position will not receive the configuration signal (as indicated by the dotted line in FIG. 5a).

The LMF further configures the serving BS (denoted "BS1" in FIG. 5a) and optionally neighboring to BSs (denoted "BS2" in FIG. 5a, however, there could also be no neighboring BS or more than 1 neighboring BS) for an on-demand PRS. This configuration may be set through the NR Positioning Protocol A (NRPPa). The involved base station(s) (i.e. the serving base station and none, one or multiple neighboring base stations) are additionally configured with a nonce (random number that is only used once). For instance, the LMF will transmit the nonce to the respective base station(s) as part of configuration data prior to the transmission of the positioning reference signal, action 1b in FIG. 5a and action 504 in FIG. 5b.

Any base stations involved will then send the PRS scrambled with the nonce to the location (which is known from any previous positioning) configured by the LMF, action 2 in FIG. 5a and action 505 in FIG. 5b.

For instance, the security nonce can be sent via a data channel (such as DCH or CCH) through a secured service application. A true UE is capable to receive the scheduled DL-PRS at a true location and decode the transmission trigger signal in the security layer or RAN protocols of RRC, MAC-CE and/or DCI. For this, a signaling for the security nonce may be present in the on-demand PRS configuration support. It includes on-demand PRS TX/RX processing behaviors of scrambling the PRS sequence with a scrambling seed combining with the nonce.

Any (true) UE will correctly receive the PRS and perform measurement on the PRS scrambled with the nonce. Specifically, in case the PRS was scrambled based on the nonce, a true UE is in possession of the nonce and will be able to descramble the PRS. Thus, a genuine UE is correctly configured to measure the PRS scrambled with the nonce and receives the PRS at its position so that the UE can perform the measurement as intended, action 3b in FIG. 5a and action 506 in FIG. 5b.

In contrast, a spoofing UE is not able to correctly measure the PRS because i) it was not configured to measure it, thus does not know the correct parameters for measurement and ii) even if the parameters would be guessed correctly, the PRS cannot be received at the actual position of the spoofing UE as the PRS is sent to the spoofed position and not to the actual position. Hence, any UE spoofing their position will not receive the PRS, action 3a and indicated by dotted line in FIG. 5a.

The UE will report their PRS measurements, action 4 in FIG. 5a and action 507 in FIG. 5b. In contrast, a spoofing UE cannot report a correct PRS and nonce measurement for the reasons given above (again indicated by the dotted line in FIG. 5a).

The LMF tries to verify the potentially received PRS measurements (if any), action 5 in FIG. 5a and action 508 in FIG. 5b. The LMF will detect incorrect measurements and nonces by the spoofing UE. However, if the verification process in action 5/action 508 is successful, the LMF can verify the UE position, action 6 in FIG. 5a.

The example described above provide the LMF with the capability to detect spoofing of positions. The LMF can, if necessary, increase the integrity level (trust, accuracy) of previous position measurements. Any positioning method (meaning as initial position estimate) can be applied in combination with the described approach. The described approach is particularly advantageous for location-based services/applications, which may require positioning with a particular level of integrity/trust in the position, e.g. geo-fenced services/applications.

Figure 6:
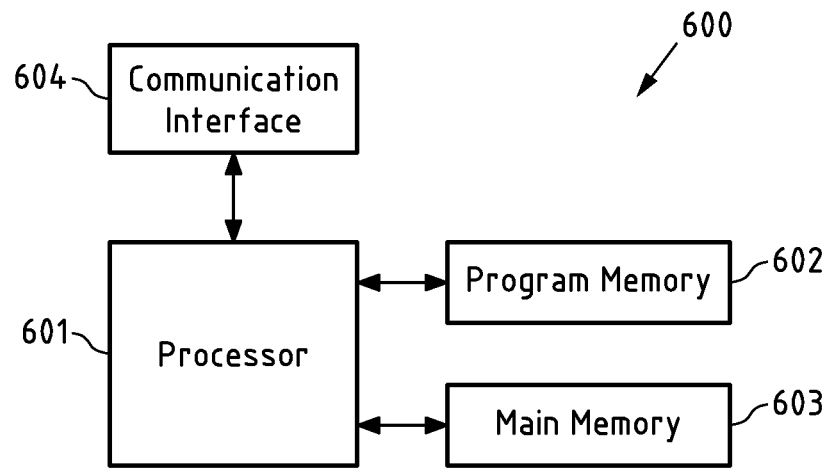
FIG. 6 is a block diagram of an exemplary embodiment of an apparatus according to the present disclosure.

Turning now to FIG. 6, there is shown a block diagram of an exemplary embodiment of a mobile device according to the present disclosure representing a UE, such as UE 10 of FIG. 1 in the form of a mobile device 600. For example, mobile device 600 may be one of a smartphone, a tablet computer, a notebook computer, a smart watch, a smart band and an IoT device.

Mobile device 600 comprises a processor 601. Processor 601 may represent a single processor or two or more processors, which are for instance at least partially coupled, for instance via a bus. Processor 601 executes a program code stored in program memory 602 (for instance program code causing mobile device 600 optionally together with network entity 700 to perform one or more of the embodiments of a method according to the present disclosure or parts thereof, when executed on processor 601), and interfaces with a main memory 603. Program memory 602 may also contain an operating system for processor 601. Some or all of memories 602 and 603 may also be included into processor 601.

One of or both of a main memory and a program memory of a processor (e.g. program memory 602 and main memory 603) could be fixedly connected to the processor (e.g. processor 601) or at least partially removable from the processor, for instance in the form of a memory card or stick.

A program memory (e.g. program memory 602) may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable from, for instance in the form of a removable SD memory card.

A main memory (e.g. main memory 603) may for instance be a volatile memory. It may for instance be a DRAM memory, to give non-limiting example. It may for instance be used as a working memory for processor 601 when executing an operating system, an application, a program, and/or the like.

Processor 601 further controls a communication interface 604 (e.g. radio interface) configured to receive and/or transmit data and/or information. For instance, communication interface 604 may be configured to transmit and/or receive radio signals from a radio node, such as a base station. It is to be understood that any computer program code based processing required for receiving and/or evaluating radio signals may be stored in an own memory of communication interface 604 and executed by an own processor of communication interface 604 or it may be stored for example in memory 603 and executed for example by processor 601.

Communication interface 604 may in particular be configured to communicate according to a cellular communication system like a 2G/3G/4G/5G or future generation cellular communication system. Mobile device 600 may use radio interface 604 to communicate with a base station, e.g. base station 20 depicted in FIG. 1.

For example, the communication interface 604 may further comprise a BLE and/or Bluetooth radio interface including a BLE transmitter, receiver or transceiver. For example, radio interface 604 may additionally or alternatively comprise a WLAN radio interface including at least a WLAN transmitter, receiver or transceiver.

The components 602 to 604 of mobile device 600 may for instance be connected with processor 601 by means of one or more serial and/or parallel busses.

It is to be understood that mobile device 600 may comprise various other components. For example, mobile device 600 may optionally comprise a user interface (e.g. a touch-sensitive display, a keyboard, a touchpad, a display, etc.).

Figure 7:
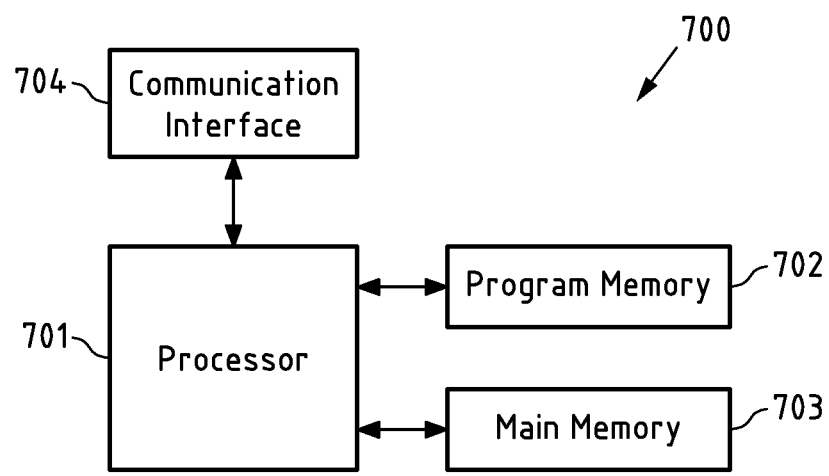
FIG. 7 is a block diagram of an exemplary embodiment of a base station.

FIG. 7 is a block diagram of an exemplary embodiment of a network entity, such as base station 20 and/or core network 30 (or a part thereof) of FIG. 1. For instance, network entity 700 may be configured for scheduling and/or transmitting positioning reference signals to mobile device, as described above.

Apparatus 700 comprises a processor 701. Processor 701 may represent a single processor or two or more processors, which are for instance at least partially coupled, for instance via a bus. Processor 701 executes a program code stored in program memory 702 (for instance program code causing apparatus 700 to perform alone or together with mobile device 600 embodiments according to the present disclosure or parts thereof), and interfaces with a main memory 703.

Program memory 702 may also comprise an operating system for processor 701. Some or all of memories 702 and 703 may also be included into processor 701.

Moreover, processor 701 controls a communication interface 704 which is for example configured to communicate according to a cellular communication system like a 2G/3G/4G/5G cellular communication system. Communication interface 704 of apparatus 700 may be realized by radio heads 30 for instance and may be provided for communicate between base station 20 and UE 10 in FIG. 1.

The components 702 to 704 of apparatus 700 may for instance be connected with processor 701 by means of one or more serial and/or parallel busses.

Mobile device 600 together with communication interface 604 may in particular be configured for receiving positioning reference signals from a network entity 700 according to the approach scheme describe herein.

It is to be understood that apparatuses 600, 700 may comprise various other components.

Figure 8:
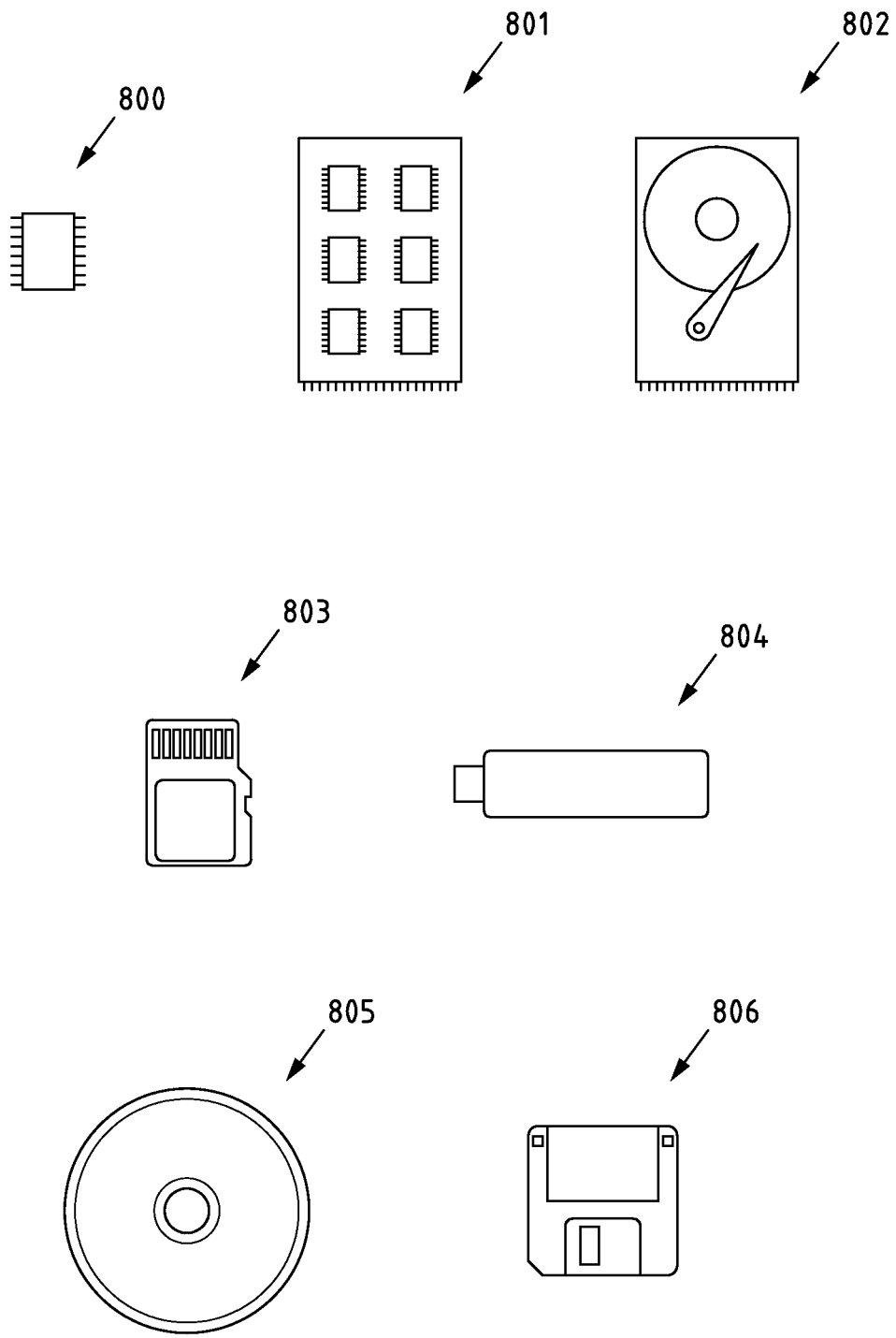
FIG. 8 is a schematic illustration of examples of tangible and non-transitory computer-readable storage media.

FIG. 8 is a schematic illustration of examples of tangible and non-transitory computer-readable storage media according to the present disclosure that may for instance be used to implement memory 602 of FIG. 6 or memory 702 of FIG. 7. To this end, FIG. 8 displays a flash memory 800, which may for instance be soldered or bonded to a printed circuit board, a solid-state drive 801 comprising a plurality of memory chips (e.g. Flash memory chips), a magnetic hard drive 802, a Secure Digital (SD) card 803, a Universal Serial Bus (USB) memory stick 804, an optical storage medium 805 (such as for instance a CD-ROM or DVD) and a magnetic storage medium 806.

The following embodiments are also disclosed:
1. A network entity comprising means for:
  obtaining or determining a position estimate of a mobile device for verification;
  transmitting or causing transmitting a positioning reference signal to a position indicated by the position estimate for verification; and
  trying to verify the position estimate for verification at least based on a potential response from the mobile device received in response to the positioning reference signal.
2. The network entity of embodiment 1, wherein the positioning reference signal is transmitted to the position indicated by the position estimate for verification using one or more of:
  at least one base station;
  precisely one base station;
  multiple base stations;
  directional transmission;
  beamforming;
  a transmission, such that the positioning reference signal is only receivable at the position estimate for verification and at a limited area around the position estimate for verification;
  at least one beam covering the position estimate for verification;
  precisely one beam covering the position estimate for verification; and/or
  multiple beams, at least one beam covering the position estimate for verification.

3. The network entity of embodiment 1 or 2, wherein the network entity comprises means for one or more of:
  providing, to one or more base stations, configuration data pertaining to the transmission of the position reference signal from one or more base stations to a specific mobile device for verification purpose;
  providing, to a specific mobile device requiring integrity verification, configuration data pertaining to the transmission of the position reference signal from one or more base stations to the specific mobile device.
4. The network entity of any of embodiments 1 to 3, wherein the network entity comprises means for one or more of:
  checking whether a response from the mobile device was received in response to the positioning reference signal in order to try to verify the position estimate for verification;
  verifying the position estimate for verification in case a response from the mobile device was received in response to the positioning reference signal; and/or
  not verifying the position estimate for verification in case no response from the mobile device was received in response to the positioning reference signal.
5. The network entity of any of embodiments 1 to 4, wherein the network entity apparatus comprises means for one or more of:
  determining a further position estimate of the mobile device based on the potential response of a mobile device to the positioning reference signal;
  comparing the position estimate for verification and the further position estimate in order to try to verify the position estimate for verification;
  verifying the position estimate for verification in case the position estimate for verification and the further position estimate indicate the same position; and/or
  not verifying the position estimate for verification in case the position estimate for verification and the further position estimate different positions.
6. The network entity of any of embodiments 1 to 5, wherein the network entity comprises means for:
  not verifying the position estimate for verification in case multiple responses from mobile devices were received in response to the positioning reference signal.
7. The network entity of any of embodiments 1 to 6, wherein the network entity comprises means for one or more of:
  transmitting or causing transmitting a nonce to a mobile device;
  transmitting or causing transmitting a nonce to a mobile device over a data channel or control channel;
  transmitting or causing transmitting a nonce to a mobile device as part of configuration data prior to the transmission of the positioning reference signal; and/or
  transmitting or causing transmitting a nonce to a base station as part of configuration data prior to the transmission of the positioning reference signal.
8. The network entity of embodiment 7, wherein the network entity comprises means for one or more of:
  transmitting or causing transmitting the positioning reference signal based on the nonce;
  scrambling the positioning reference signal based on the nonce for transmission to the position indicated by the position estimate for verification; and/or
  checking whether a response from the mobile device obtained in response to the positioning reference signal comprises the nonce.

9. The network entity of any of embodiments 1 to 8, wherein the positioning reference signal is one or more of
an aperiodic positioning reference signal;
an on-demand positioning reference signal; and/or
a downlink positioning reference signal.

10. The network entity of any of embodiments 1 to 9, wherein multiple positioning reference signals are transmitted using multiple base stations and/or multiple beams, wherein some or all base stations and/or beams use a different nonce for transmitting a respective positioning reference signal.

11. The network entity of any of embodiments 1 to 10, wherein the network entity comprises means for one or more of:
informing a user of a mobile device of a potential spoofing existence in case the position estimate for verification is not verified; and/or
informing an operator of a network of a potential spoofing existence in case the position estimate for verification is not verified; and/or
informing another network function or another network entity of a potential spoofing existence in case the position estimate for verification is not verified.

12. The network entity of any of the embodiments 1 to 11, wherein the network entity comprises means for one or more of:
determining a nonce for positioning integrity by means of a high layer in the network entity; and
obtaining a nonce from a service application.

13. The network entity of any of embodiments 1 to 12, wherein the network entity is or comprises at least one of:
a base station;
a network entity implementing a location management function;
a network entity communicating with at least one base station.

14. A method, performed at least by a network entity, the method comprising:
obtaining or determining a position estimate of a mobile device for verification;
transmitting or causing transmitting, based on the position estimate for verification, a positioning reference signal to the position indicated by the position estimate for verification; and
trying to verify the position estimate for verification at least based on a potential response from the mobile device received in response to the positioning reference signal.

15. A mobile device comprising means for
receiving a nonce from a network;
receiving a positioning reference signal from the network;
transmitting, to the network, a response to the received positioning reference signal for verification of a position estimate of the mobile device; and
using the received nonce for at last one of said receiving, from the network, of the positioning reference signal and said transmitting, to the network, of the response to the received positioning reference signal.

16. The mobile device of claim 15, wherein the response to the received positioning reference signal is based on a measurement on the received positioning reference signal, the measurement comprising one or more of:
a timing measurement;
an angular measurement;
a signal received power measurement;
a downlink time difference of arrival, DL-TDOA, measurement;
an uplink time difference of arrival, UL-TDOA, measurement;
a downlink angle of departure, AoD, measurement; and
an angle of arrival, AoA, measurement.

17. The mobile device of embodiment 15 or 16, wherein the received nonce is used for said receiving, from the network, of the positioning reference signal, by descrambling the positioning reference signal at least based on the nonce.

18. The mobile device of any of embodiments 15 to 17, the mobile device comprising means for:
obtaining configuration data pertaining to the reception of the position reference signal.

19. The mobile device of any of embodiments 15 to 18, the mobile device comprising means for:
receiving the nonce from the network via a service application layer.

20. A method, performed at least by a mobile device, the method comprising:
receiving a nonce from a network;
receiving a positioning reference signal from the network;
transmitting, to the network, a response to the received positioning reference signal for verification of a position estimate of the mobile device; and
using the received nonce for at last one of said receiving, from the network, of the positioning reference signal and said transmitting, to the network, of the response to the received positioning reference signal.

21. Computer program code, the computer program code when executed by a processor of an apparatus causing said apparatus to perform a method according to any of embodiments 14 or 20.

22. Computer readable storage medium comprising computer program code according to embodiment 21.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to sections of processor(s)/software (including digital signal processor(s)), software, and memory(ies) that work together to cause an apparatus, such as a mobile phone, to perform various functions) and
(c) to circuits, such as a microprocessor(s) or a section of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 601 and 701 of FIGS. 6 and 7, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (i) A, or (ii) B, or (iii) C, or (iv) A and B, or (v) A and C, or (vi) B and C, or (vii) A and B and C.

It will be understood that the embodiments disclosed herein are only exemplary, and that any feature presented for a particular exemplary embodiment may be used with any aspect of the present disclosure on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

LIST OF ABBREVIATIONS

3GPP Third Generation Partnership Project
5GS 5G System
5GC 5G Core
DCI Downlink Control Information
NR New Radio
UE User Equipment
PRS Position Reference Signal
Rel Release
BS Base Station
DL-TDOA Downlink-Time Difference of Arrival
DL-AoA Downlink-Angle of Arrival
LMF Location Management Function
MN Mobile Network
SRS Sounding Reference Signal
DL RSRP Downlink Reference Signal Received Power
DL RSTD Downlink Reference Signal Time Difference
Rx Receive
Tx Transmit
Multi-RTT Multi-Cell Round Trip Time

What is claimed is:

1. A network entity comprising:
at least one processor; and
at least one memory storing instructions that, when executed by the at least one processor, cause the network entity at least to:
determine a first position estimate of a mobile device for verification, wherein the first position estimate indicates a service position obtained from a previous positioning measurement;
obtain a nonce from a secured service application via a data channel comprising one of a dedicated control channel or a common control channel, wherein the nonce is a random number or word used only once for scrambling to prevent replay attacks;
transmit a positioning reference signal to the position indicated by the first position estimate, wherein the positioning reference signal is:
an on-demand downlink positioning reference signal scheduled aperiodically in response to a location verification request,
beamformed toward the service position using at least one beam of a serving base station and at least one beam of a neighboring base station configured via a New Radio Positioning Protocol A message, and
scrambled based on the nonce; and wherein scrambling the positioning reference signal based on the nonce by scrambling a sequence of the positioning reference signal with a scrambling seed combined with the nonce;
verify the first position estimate at least based on a potential response from the mobile device received in response to the positioning reference signal within a limited time window, wherein the verification comprises:
analyzing whether the potential response is based on the nonce;
determining a second position estimate of the mobile device based on the potential response; and
verifying, in response to a determination that only a single response is received, the first position estimate when the first position estimate and the second position estimate indicate a same service position; and
after verifying the first position estimate, not verifying the first position estimate for verification upon subsequently receiving multiple responses from mobile devices in response to the positioning reference signal, thereby indicating a spoofing attempt.

2. The network entity according to claim 1, wherein the network entity is further caused to perform:
provide, to one or more base stations, configuration data pertaining to the transmission of the positioning reference signal from one or more base stations to the mobile device for verification; and
provide, to the mobile device requiring integrity verification, configuration data pertaining to the transmission of the position reference signal from the one or more base stations to the mobile device.

3. The network entity according to claim 2, wherein the network entity is further caused to perform:
check whether the response from the mobile device was received in response to the positioning reference signal to verify the first position estimate;
verify the first position estimate when a response from the mobile device is received; and
not verify the first position estimate for verification when no response from the mobile device is received.

4. The network entity according to claim 2, wherein the network entity is further caused to perform:

compare the first position estimate and the second position estimate to verify the first position estimate;

not verify the first position estimate when the first position estimate for verification and the second position estimate are at different positions.

5. The network entity according to claim 4, wherein the network entity is caused to further perform:

transmit the nonce to the mobile device as part of configuration data prior to the transmission of the positioning reference signal;

transmit the nonce to a base station as part of configuration data prior to the transmission of the positioning reference signal.

6. The network entity according to claim 5, wherein multiple positioning reference signals are transmitted using multiple base stations and multiple beams, and wherein all of the base stations and the beams use a different nonce for transmitting a respective positioning reference signal.

7. The network entity according to claim 6, wherein the network entity is further caused to perform:

inform a user of the mobile device of a potential spoofing existence when the first position estimate for verification is not verified;

inform an operator of a network of the potential spoofing existence when the first position estimate for verification is not verified; and inform another network function or another network entity of the potential spoofing existence when the first position estimate for verification is not verified.

8. The network entity according to claim 1, wherein the network entity further comprises:

a base station;

a network entity implementing a location management function; and a network entity communicating with at least one base station.

9. A method, performed at least by a network entity, the method further comprising:

obtaining a first position estimate of a mobile device for verification, wherein the first position estimate indicates a service position obtained from a previous positioning measurement;

obtaining a nonce from a secured service application via a data channel comprising one of a dedicated control channel or a common control channel, wherein the nonce is a random number or word used only once for scrambling to prevent replay attacks;

transmitting positioning reference signal to the position indicated by the first position estimate, wherein the positioning reference signal is:

an on-demand downlink positioning reference signal scheduled aperiodically in response to a location verification request, beamformed toward the service position using at least one beam of a serving base station and at least one beam of a neighboring base station configured via a New Radio Positioning Protocol A message, and scrambled based on the nonce; and wherein scrambling the positioning reference signal based on the nonce by scrambling a sequence of the positioning reference signal with a scrambling seed combined with the nonce;

verifying the first position estimate based on a potential response from the mobile device received in response to the positioning reference signal, within a limited time window, wherein the verification comprises:

analyzing whether the potential response is based on the nonce;

determining a second position estimate of the mobile device based on the potential response; and verifying, in response to a determination that only a single response is received, the first position estimate when the first position estimate and the second position estimate indicate a same service position; and after verifying the first position estimate, not verifying the first position estimate for verification upon subsequently receiving multiple responses from mobile devices in response to the positioning reference signal, thereby indicating a spoofing attempt.

* * * * *